United States Patent
Kretschmar et al.

(10) Patent No.: US 11,477,620 B2
(45) Date of Patent: Oct. 18, 2022

(54) VEHICLE-TO-X COMMUNICATION IN THE USA AND EUROPE USING A STANDARD TRANSMITTER

(71) Applicant: Continental Teves AG & Co. oHG, Frankfurt (DE)

(72) Inventors: Sven Kretschmar, Gustavsburg (DE); Torsten Martin, Steinbach/Taunus (DE); Nils Bauch, Idstein (DE); Marc Menzel, Weimar (DE); Horst Geib, Gau-Algesheim (DE)

(73) Assignee: Continental Teves AG & Co. oHG

( * ) Notice: Subject to any disclaimer, the term of this patent is extended or adjusted under 35 U.S.C. 154(b) by 894 days.

(21) Appl. No.: 15/304,250

(22) PCT Filed: Apr. 9, 2015

(86) PCT No.: PCT/EP2015/057668
§ 371 (c)(1),
(2) Date: Jan. 15, 2019

(87) PCT Pub. No.: WO2015/158591
PCT Pub. Date: Oct. 22, 2015

(65) Prior Publication Data
US 2021/0321232 A1    Oct. 14, 2021

(30) Foreign Application Priority Data

Apr. 14, 2014   (DE) .................... 10 2014 207 093.7
Dec. 18, 2014   (DE) .................... 10 2014 018 672.5

(51) Int. Cl.
*H04W 4/40*     (2018.01)
*H04W 4/029*    (2018.01)
(Continued)

(52) U.S. Cl.
CPC ............ *H04W 4/40* (2018.02); *G08G 1/0112* (2013.01); *H04L 69/18* (2013.01); *H04W 4/029* (2018.02);
(Continued)

(58) Field of Classification Search
CPC ....... H04W 4/029; H04W 76/10; H04W 4/02; H04W 4/024; H04W 4/21; H04W 4/40;
(Continued)

(56) References Cited

U.S. PATENT DOCUMENTS 5,635,940 A * 6/1997 Hickman ............ H04L 61/5084
455/457
5,790,800 A * 8/1998 Gauvin ..................... H04L 9/40
709/227

(Continued)

FOREIGN PATENT DOCUMENTS

DE   102010029485 A1   12/2010
DE   102014207093 A1   10/2015
(Continued)

OTHER PUBLICATIONS

English translation of JP20044248005A Jan. 2022 (Year: 2022).*
(Continued)

*Primary Examiner* — William D Cumming

(57) ABSTRACT

A method for supplying data which can be received by a vehicle in a vehicular ad-hoc network, in which the data is transmitted between subscribers to the vehicular ad-hoc network using a location-based communications protocol, involves: identifying a geographical location area of the vehicle; selecting a suitable communications protocol (for the identified location area; and receiving the data using the selected communications protocol in such a way that the received data is available to at least one network layer of the communications protocol.

8 Claims, 4 Drawing Sheets

(51) Int. Cl.
   *G08G 1/01* (2006.01)
   *H04W 4/12* (2009.01)
   *H04L 69/18* (2022.01)
   *H04W 64/00* (2009.01)
   *H04W 80/02* (2009.01)
   *H04W 80/04* (2009.01)
   *H04W 84/18* (2009.01)

(52) U.S. Cl.
   CPC ............. *H04W 4/12* (2013.01); *H04W 64/00* (2013.01); *H04W 80/02* (2013.01); *H04W 80/04* (2013.01); *H04W 84/18* (2013.01)

(58) Field of Classification Search
   CPC ....... H04W 64/00; H04W 8/18; H04W 8/005; H04W 28/0263; G08G 1/0112
   USPC ............ 455/456.1, 456.2, 456.3, 562.1, 457, 455/569.2
   See application file for complete search history.

(56) References Cited

U.S. PATENT DOCUMENTS

| | | |
|---|---|---|
| 6,256,778 B1 | 7/2001 | Oliver |
| 8,705,527 B1 | 4/2014 | Addepalli et al. |
| 8,838,383 B2 | 9/2014 | Stahlin et al. |
| 9,083,581 B1 | 7/2015 | Addepalli et al. |
| 9,185,135 B2 * | 11/2015 | Gupta ................... H04W 4/029 |
| 9,660,949 B2 * | 5/2017 | Foti ........................ H04W 4/029 |
| 10,264,484 B2 * | 4/2019 | Lee ........................ H04W 76/15 |
| 2002/0021796 A1 | 2/2002 | Schessel |
| 2004/0192336 A1 | 9/2004 | Walby |
| 2006/0009219 A1 | 1/2006 | Jaakkola et al. |
| 2006/0109815 A1 | 5/2006 | Ozer |
| 2010/0148940 A1 | 6/2010 | Gelvin et al. |
| 2010/0234071 A1 * | 9/2010 | Shabtay ................. H04B 7/155 455/562.1 |
| 2010/0331013 A1 * | 12/2010 | Zhang ................... G01S 5/0242 455/456.2 |
| 2011/0034183 A1 | 2/2011 | Haag et al. |
| 2011/0053611 A1 * | 3/2011 | Loeb ...................... H04W 4/029 455/456.3 |
| 2011/0151845 A1 | 6/2011 | Staykoff |
| 2011/0313874 A1 * | 12/2011 | Hardie ................. G06Q 20/306 705/26.1 |
| 2012/0192258 A1 * | 7/2012 | Spencer ................. H04W 8/18 726/7 |
| 2012/0220231 A1 | 8/2012 | Stählin et al. |
| 2012/0239294 A1 | 9/2012 | Stahlin et al. |
| 2013/0099941 A1 | 4/2013 | Jana et al. |
| 2013/0250824 A1 | 6/2013 | Sakata |
| 2013/0282263 A1 | 10/2013 | Tee |
| 2013/0297387 A1 * | 11/2013 | Michael ................ G06Q 30/02 705/13 |
| 2014/0022128 A1 | 1/2014 | Smith |
| 2014/0155099 A1 * | 6/2014 | Cho ........................ H04W 4/02 455/456.3 |
| 2014/0179337 A1 * | 6/2014 | Alpert ................... G01S 5/0263 455/456.1 |
| 2015/0237040 A1 | 8/2015 | Levin |
| 2016/0165031 A1 * | 6/2016 | Gopinath ............... H04W 8/005 455/569.2 |
| 2016/0337895 A1 * | 11/2016 | Lee ..................... H04W 28/0263 |
| 2019/0090150 A1 * | 3/2019 | Axén et al. ............ H04L 5/0094 |
| 2019/0132709 A1 * | 5/2019 | Graefe ................. G08G 1/0141 |
| 2019/0141495 A1 * | 5/2019 | Jha ........................ H04L 45/122 |
| 2019/0228863 A1 * | 7/2019 | Dharwad ............... G16H 20/17 |
| 2019/0297524 A1 * | 9/2019 | Yi ........................... H04L 47/30 |
| 2019/0313220 A1 | 10/2019 | Menzel |
| 2021/0321232 A1 * | 10/2021 | Kretschmar ......... G08G 1/0112 |

FOREIGN PATENT DOCUMENTS

| | | | |
|---|---|---|---|
| DE | 102014018672 A1 | 6/2016 | |
| EP | 1630747 A2 | 3/2006 | |
| EP | 1708144 A2 | 10/2006 | |
| EP | 2663101 A2 | 11/2013 | |
| EP | 3132648 A1 | 2/2017 | |
| EP | 3132648 B1 * | 6/2019 | ........... G08G 1/0112 |
| JP | 2004248005 A * | 9/2004 | |
| WO | 2010139526 A1 | 12/2010 | |
| WO | 2015158606 A1 | 10/2015 | |
| WO | WO-2015158591 A1 * | 10/2015 | .............. H04W 4/40 |

OTHER PUBLICATIONS

T. L. Willke, P. Tientrakool and N. F. Maxemchuk, "A survey of inter-vehicle communication protocols and their applications," in IEEE Communications Surveys & Tutorials, vol. 11, No. 2, pp. 3-20, Second Quarter Sep. 2009, doi: 10.1109/SURV.2009.090202. (Year: 2009).*

I. Lequerica, P. M. Ruiz and V. Cabrera, "Improvement of vehicular communications by using 3G capabilities to disseminate control information," in IEEE Network, vol. 24, No. 1, pp. 32-38, Jan.-Feb. 2010, doi: 10.1109/MNET.2010.5395781. (Year: 2010).*

German Search Report dated Jan. 22, 2018 for corresponding German Patent Application No. 10 2014 207 093.7.

International Search Report and Written Opinion dated Jul. 7, 2015 from corresponding International Patent Application No. PCT/EP2015/057668.

Demestichas et al., Intelligent Advanced Driver Assistance System for Elecli ic Vehicles, Intelligent Vehicles Symposium, IEEE, p. 78-82, 2011, Baden-Baden, Germany.

Karagiannis et al., Vehicular Networking: A Survey and Tutorial on Requirements, Architectures, Challenges, Standards and Solutions, IEEE Communications Surveys, ISSN: 1553-877X, date: Oct. 1, 2011, p. 584-616, New York.

Bernard Oehry et al., "The CARDME Concept", Project IST—1999-29053, 1, Issue 3, Jun. 2002.

ETSI Draft; HTG Backgrounddocument, European Telecommunications Standards Institute (ETSI), 650, Route Des Lucioles; F-06921 Sophia-Antipolis; France, Bd. ITS, Sep. 20, 2012, Seiten 1-67, XP014086489.

* cited by examiner

US 11,477,620 B2

VEHICLE-TO-X COMMUNICATION IN THE USA AND EUROPE USING A STANDARD TRANSMITTER

TECHNICAL FIELD

The invention relates to a method for providing data that are receivable with a vehicle in a vehicle ad-hoc network in which the data are transmitted using a location dependent communication protocol between network subscribers subscribing to the vehicle ad-hoc network, to a control apparatus for performing the method and to a vehicle having the control apparatus.

BACKGROUND

Vehicle-to-X or Vehicle-2-X communications is understood to mean in particular communication between vehicles (vehicle-to-vehicle communication) and communication between vehicles and infrastructure (vehicle-to-infrastructure communication).

WO 2010/139 526 A1 discloses a mobile ad-hoc network called Car2X whose nodes are particular road users such as vehicles or other objects in road traffic, such as traffic lights. These networks can be used to provide the road users involved in the Car2X network with advice of road traffic conditions, such as accidents, queues, hazard situations, etc., that can be gathered only on a very time critical basis using pure ambient sensor systems. Therefore, the road users involved in the Car2X network normally have more time left to react in the event of adverse or traffic-imperiling road traffic conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is an object to improve the use of Vehicle-to-X communication.

According to one aspect, a method for providing data that are receivable by a vehicle in a vehicle ad-hoc network, in which the data is transmitted using a location dependent communication protocol between network subscribers subscribing to the vehicle ad-hoc network, comprises: identification of a geographical location area of the vehicle, selection of a suitable communication protocol for the identified location area, and reception of the data using the selected communication protocol, so that the received data are available to at least one network layer situated above the communication protocol.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
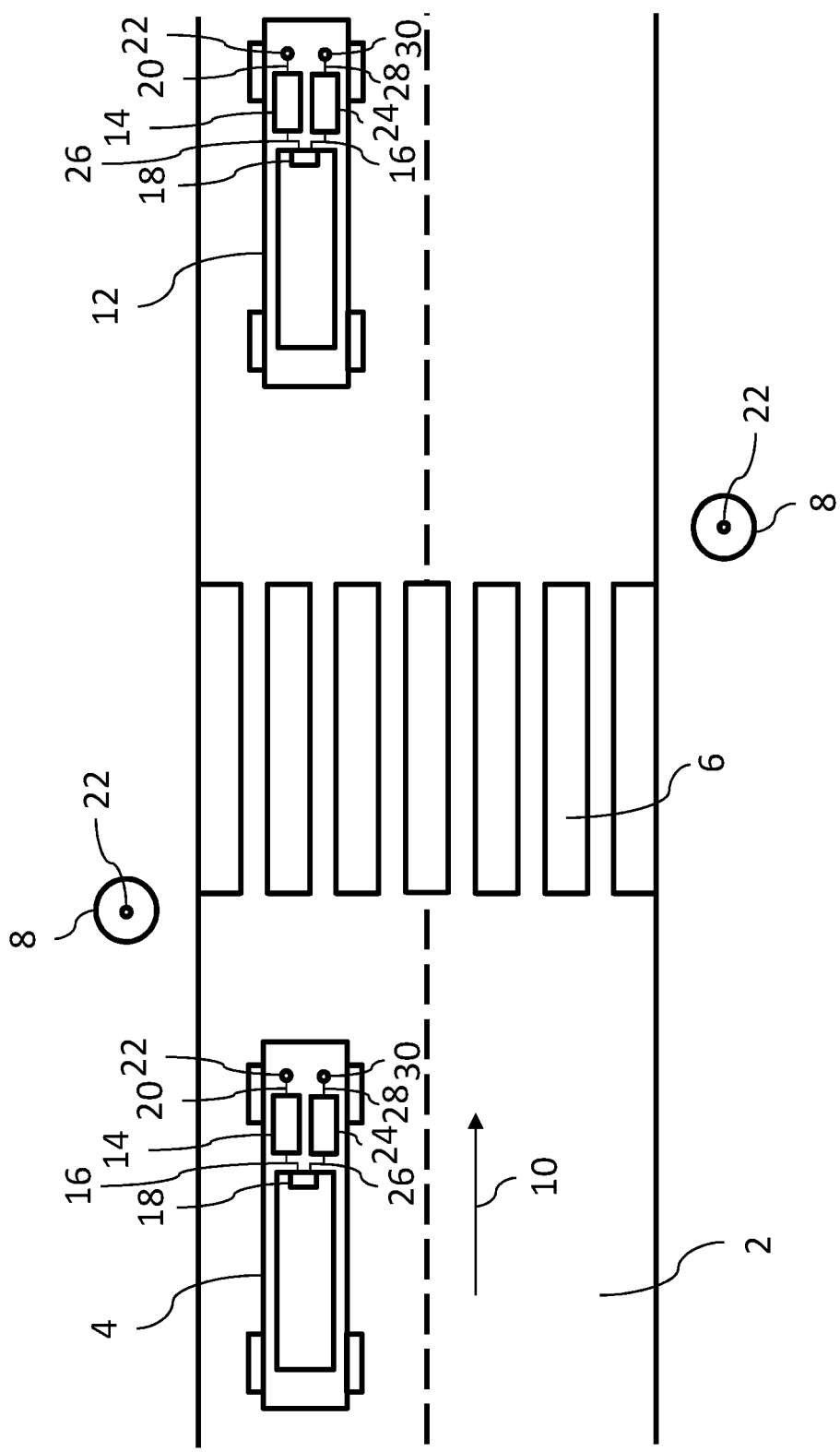
FIG. 1 shows a basic illustration of a vehicle travelling on a road.

Reference is made to FIG. 1, which shows a basic illustration of a vehicle 4 travelling on a road 2.

In the present embodiment, the road 2 is intended to have a pedestrian crossing 6 at which a set of traffic lights 8 is used to control whether the vehicle 4 on the road 2 is permitted to cross the pedestrian crossing 6 or a pedestrian, not shown further, on the pedestrian crossing 6 is permitted to cross the road 2.

In a direction of travel 10 ahead of the vehicle 4, FIG. 1 shows a further vehicle 12 that moves in the same direction of travel 10 as that in which the vehicle 4 also moves.

In the present embodiment, the vehicle 4 has a receiver 14 for a global satellite navigation system, subsequently called GNSS receiver 14, by means of which the vehicle 4 can determine position data in the form of its absolute geographical position 16 in a manner known per se and can use them, for example as part of a navigation system 18, in order to display said absolute geographical position on a geographical map, not shown further. Appropriate signals 20 from the global satellite navigation system, subsequently called GNSS signals 20, can be received via an appropriate GNSS antenna 22, for example, and forwarded to the GNSS receiver in a manner known per se.

In the present embodiment, the vehicle further has a transmitter 24 by means of which the vehicle can combine with the further vehicle 12 and/or the traffic lights 8 to form a vehicle ad-hoc network called Vehicle-to-X network and can interchange data. This transmitter 24 will subsequently be called Vehicle-to-X transmitter 24 in order to distinguish it from the GNSS receiver 14. As a case example, the Vehicle-to-X transmitter 24 is subsequently intended to receive position data in the form of an absolute geographical position 26 from the further vehicle 12, which the further vehicle 12 transmits in an appropriate Vehicle-to-X signal 28 in a manner that is yet to be described. The Vehicle-to-X signal 28 is received in the vehicle 4 via a Vehicle-to-X antenna 30 and forwarded to the Vehicle-to-X transmitter 24.

At this juncture, it should be pointed out that a large amount of information, subsequently also called user data, can be interchanged among the individual network subscribers within a Vehicle-to-X network, said information being specified in region specific standards. The interchangeable user data are standardized as part of ETSI TC ITS in the case of European Telecommunications Standards Institute (ETSI) in Europe and as part of IEEE 1609 in the case of Institute of Electrical and Electronics Engineers (IEEE) and in the case of Society of Automotive Engineers (SAE) in the United States of America, inter alia. For the sake of clarity, however, the case example will be used that position data are transmitted that can be displayed to individual subscribers to the Vehicle-to-X network, for example on the navigation systems 18.

Furthermore, the vehicle 4 is moreover set up to send its absolute geographical position 16 derived from the GNSS signal 20 to the further vehicle 12 in an appropriate Vehicle-to-X signal 28 so that said further vehicle likewise knows the absolute geographical position 16 of the vehicle 4. Accordingly, the further vehicle 12 derives its absolute geographical position 26 from the GNSS signal 20 and receives the absolute geographical position 16 of the vehicle 4 via the Vehicle-to-X signal 28.

Finally, the traffic lights 8 may also be set up to send their absolute geographical position via a Vehicle-to-X antenna 22 in a manner that is not shown further. Although the absolute geographical position of the traffic lights 8 could be determined by means of a previously cited GNSS system, since the traffic lights 8 do not move, however, it is possible for their absolute geographical position to be firmly determined once and firmly stored in an internal memory of the traffic lights 8, for example, so that it is possible to dispense with a separate costly GNSS system.

Figure 2:
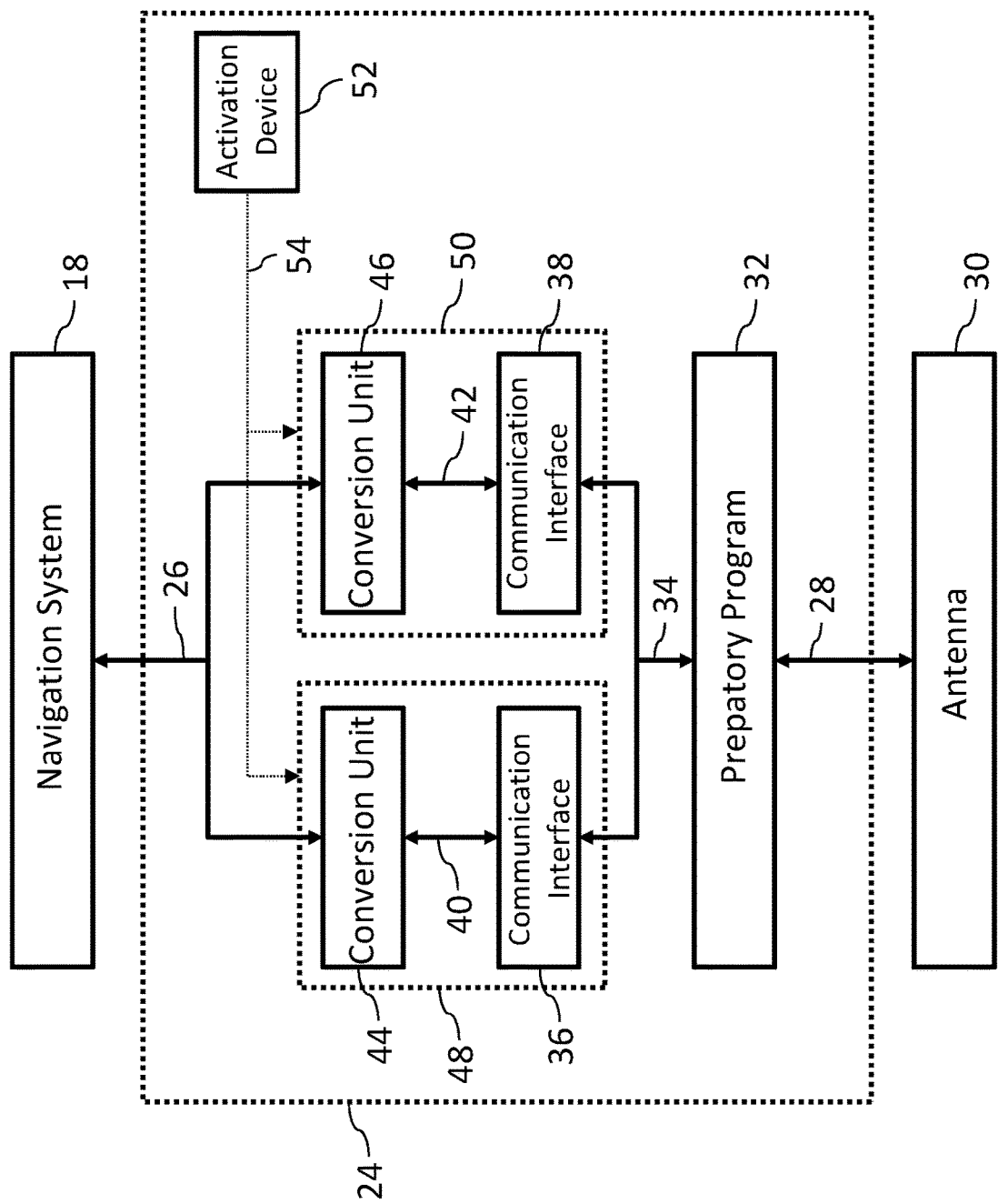
FIG. 2 shows a basic illustration of an apparatus for receiving and sending Vehicle-to-X information in the vehicle in FIG. 1.

As already explained earlier, interchange of the user data, that is to say of the position data in the present example, is standardized on a region specific basis, for example because a different communication protocol is used in America than in Europe. Therefore, the Vehicle-to-X transmitter 24 would actually need to be matched to the region in which it is intended to be used. To avoid this, however, it is proposed to develop the Vehicle-to-X transmitter 24 in the manner explained below with reference to FIG. 2.

In the present exemplary embodiment, the Vehicle-to-X transmitter 24 is in the form of a computation device on which different programs for receiving and sending the position data 26 by means of the Vehicle-to-X signal 28 are executed.

When a Vehicle-to-X signal 28 is intended to be received via the antenna 30, it is demodulated in a preparatory program portion 32, filtered and converted into a data stream 34 that is understood by one of the aforementioned communication protocols and can be converted into the position data 26 that are to be transmitted.

The data stream 34 is then forwarded to two different communication interfaces 36, 38. While the first communication interface 36 is set up to decrypt the data stream 34 in accordance with the communication protocol based on the ETSI TC IST standard, the second communication interface 38 is set up to decrypt the data stream 34 in accordance with the communication protocol based on the IEEE 1609 standard. The two communication interfaces 36, 38 accordingly output a first protocol specific user data stream 40 and a second protocol specific user data stream 42, each of which describes the position data 26 in accordance with the respective standard.

In order to provide the first protocol specific user data stream 40 and the second protocol specific user data stream 42 and hence the position data 26 for the navigation system 18 in a generally comprehensible standard form, the present embodiment has provision for conversion units 44, 46 that convert the protocol specific user data stream 40, 42 into the generally comprehensible standard form and then provide them for the navigation system 18. In this way, the navigation system 18 does not need to be designed specifically for one particular communication protocol.

If, conversely, the position data 26 are conversely intended to be sent in the Vehicle-to-X signal 28 via the antenna 30, then the flow of data described above runs in the opposite direction, this not being discussed further for the sake of clarity.

Expediently, only one of the two communication interfaces 36, 38 is activated during operation of the Vehicle-to-X transmitter 24. To this end, the two communication interfaces 36, 38 are stored, together with the respective conversion units 44, 46, as a program in a separate partition 48, 50 of the Vehicle-to-X transmitter 24 each, each partition 48, 50 being able to be activated by an activation device 52, which is yet to be described, using a control signal 54. Alternatively, the communication interfaces 36, 38 and the conversion units 44, 46 can also each be implemented in separate tasks or processes, these then being able to be activated or deactivated using appropriate means, such as commands or messages.

Figure 3:
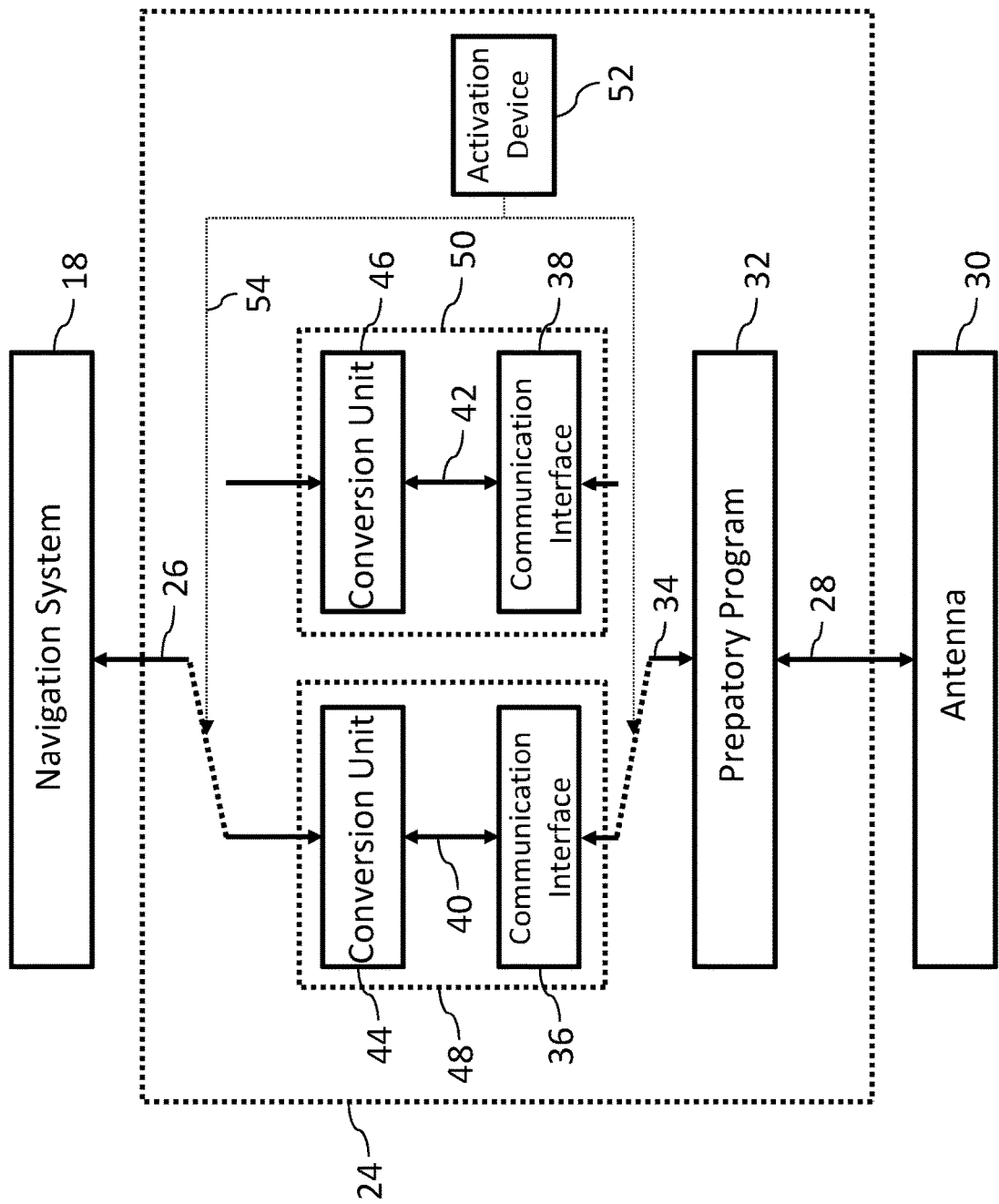
FIG. 3 shows a basic illustration of an alternative apparatus for receiving and sending Vehicle-to-X information in the vehicle in FIG. 1.

Instead of activating the individual partitions 48, 50, the activation device 52 can also control the flow of data using the control signal 54, as shown in FIG. 3. In this case, the partition 48, 50 having the unused communication interface 36, 38 can optionally be deactivated.

Figure 4:
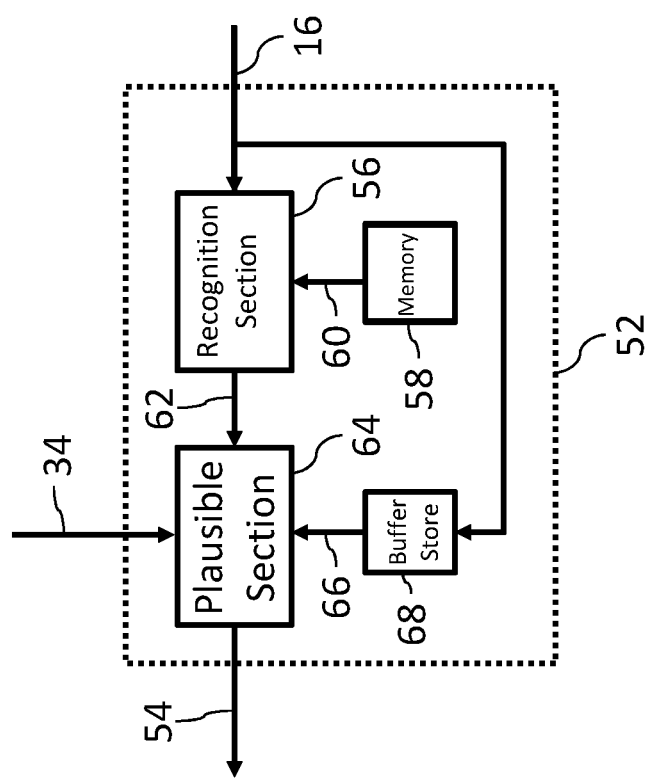
FIG. 4 shows a basic illustration of an apparatus for producing a control signal for controlling the apparatuses shown in FIG. 3 or 4.

Reference is made to FIG. 4, which will be taken as a basis for explaining the manner of operation of the activation device 52 in more detail.

The activation device 52 comprises a recognition section 56 to which the aforementioned absolute geographical position 16 of the vehicle 2 is supplied. Further, the activation device 52 comprises an area memory 58 that stores potential geographical location areas 60 for the vehicle. These location areas 60 may be Europe or America, for example. Each potential geographical location area 60 is described by known features, the existence of which is checked in the recognition section 56. As part of the present embodiment, these features are the absolute geographical positions that are delimited by the respective potential geographical location areas 60. Hence, the recognition section 56 checks whether the absolute geographical position 16 received via the GNSS receiver 14 falls within one of the potential geographical location areas 60. If the absolute geographical position 16 falls within one 62 of the potential location areas 60, then the recognition section 56 outputs this specific geographical location area 62 that contains the vehicle 4 as a result.

The recognized specific geographical location area 62 is then checked again in a plausibilization section 64. To this end, the plausibilization section 64 receives the aforementioned data stream 34 and checks it for its form. By way of example, the data stream 34 could have a particular form in one of the potential geographical location areas 60 because it carries the user data as a TDMA channel. In order to increase certainty further, the plausibilization section 64 can also plausibilize the recognized geographical location area 62 on the basis of the most recently detected absolute geographical position 66 which can be buffer stored in a buffer store 68, for example. There are further numerous plausibilization options, but these will not be discussed further for the sake of brevity.

If the outcome of the plausibilization is positive, then the plausibilization section 64 produces the control signal 54 in accordance with the recognized specific geographical location area 62.

The indicated method is based on the consideration that the data in a vehicle ad-hoc network, such as the Vehicle-to-X network cited at the outset, need to be transmitted using a particular communication protocol. However, such communication protocols are standardized on a country specific basis as part of ETSI TC ITS in the case of ETSI in Europe and as part of IEEE 1609 in the case of IEEE and in the case of SAE in the United States of America, inter alia. Hence, network architectures using the communication protocols are each designed just for either the European market or the American market, and there is also no provision for the two communication protocols to be harmonized. However, it is recognized as part of the indicated method that the user data sent using the communication protocols are similar, which means that the application layers that are based on the communication protocols defined in ETSI TC ITS and in IEEE 1609 can be developed in the same way. Examples of these are the "Green Light Optimal Speed Advisory" (GLOSA) or "Emergency Vehicle Warning" (EVW) functions. In other words, the user data interchanged are ultimately the same. There is merely a difference in the type of the data transmissions, which is dependent on the respective country in which the vehicle subscribing to the vehicle ad-hoc network is located.

This is the starting point for the indicated method, with the proposal to precede reception of the actual user data by first of all selecting a suitable protocol. Since this protocol is dependent on the location of the vehicle and hence on its geographical location area, it is proposed as part of the indicated method to identify the location of the vehicle and hence its geographical location area and then to take the identified location as a basis for selecting a suitable communication protocol therefor. In this way, the vehicle may be subscriber to a vehicle ad-hoc network for which a communication protocol is available and selectable at any desired location and hence in any desired geographical location area.

It is therefore possible for different markets to be served by a single system, and hence by a single communication architecture, which means that production complexity and hence manufacturing costs for the communication architecture can be lowered.

In respect of the specific communication protocols ETSI TC ITS and IEEE 1609 cited above, although there are also user data that are not provided in the respective other communication protocol, these can be rejected in the collective communication architecture if they are unusable in the identified geographical location area. As such, the "blind spot and lane change warning" user data are not supported in Europe and the "pre-crash airbag support" user data are not supported in the USA. There are also no plans to include these user data in the respective standard.

In a manner corresponding to the reception of data, a method for sending data via a vehicle ad-hoc network in which the data are transmitted using a location dependent communication protocol between network subscribers subscribing to the vehicle ad-hoc network, with a vehicle as a network subscriber, in accordance with a further aspect comprising the steps of: identification of a geographical location area of the vehicle, selection of a suitable communication protocol for the identified location area, retrieval of data from at least one network layer situated above the communication protocol, and sending of the retrieved data using the selected communication protocol.

With this indicated method too, a vehicle may be a subscriber to a vehicle ad-hoc network using a location dependent communication protocol in different geographical regions and hence in different geographical location areas, which means that a standardized communication architecture can be provided in this case too.

The identification of the geographical location area can be broken down into different steps. Expediently, the indicated method should, however, recognize the geographical location area in a development for identifying the geographical location area of the vehicle. This can be accomplished in an inherently arbitrary manner. By way of example, the already existent communication protocols could be broadened such that only reception of data sent using the communication protocols reveals the geographical location area. It is debatable whether this is implemented as such.

It would also be possible to attempt to take the structure of the data sent using the communication protocol as a basis for inferring the geographical location area. As such, in the communication protocol of IEEE 1609.4, for example, the data to be sent are transmitted on channel 178, the control channel, by means of channel switching. Channel switching is remarkable for 50 ms of high channel load (many messages, high noise level, high energy level) being followed in each case by 50 ms of low channel load predominating. Depending on the equipment of the apparatus performing the indicated method, one or more of the parameters mentioned can be measured. If channel switching is discovered, then the vehicle has a high probability of being in the geographical region that uses the communication protocol of IEEE 1609.4, that is to say in America.

One way of making recognition of the geographical location area of the vehicle independent of the design of the communication protocol is to check whether features that are known in the surroundings of the vehicle are detectable by measurement, monitoring, etc. and indicate a previously known geographical location area.

To this end, in a preferred development of the indicated method, for example, it would be possible for the known feature used to be a geographical position that is associable with a predetermined geographical location area and received via a global satellite navigation system. That is to say that, as part of the indicated development, the global satellite navigation system is first of all used to detect the current location of the vehicle, and then a database is checked to determine whether the detected location is known, or at least whether there is a communication protocol available for the detected location. By way of example, global satellite navigation signals may be a global positioning system signal, GPS signal for short, a Глобальная Навигационная Спутниковая Система signal, GLONASS signal for short, or a Galileo signal.

In order to reduce or even to prevent errors in the identification of the geographical location that may possibly even occur only in the short term, it is possible, in another development of the indicated method, for identification of the geographical location area of the vehicle to involve the recognized geographical location area being plausibilized.

This plausibilization can involve the use of different constraints, to which the vehicle is subject, individually or in any combination.

Firstly, an attempt could be made to recognize the mobile radio system that is used in the current geographical location area of the vehicle. If it is not possible for this recognized mobile radio system to be associated with a mobile radio system that is known to be used in the recognized geographical location area, then there is probably an error in the recognition of the location area. In this case, both the radio standard and the mobile radio provider can be taken into consideration for the purposes of the mobile radio system that is to be recognized, depending on the technical requirements of the system that forms the indicated method.

Alternatively or additionally, it would be possible for a previously stored geographical location area that has already been recognized as correct and the currently recognized geographical location area to be compared with one another. In most cases, it is improbable that the vehicle will move over distances (particularly between the continents) that are so great that the communication protocol changes.

It would also be possible for the current vehicle configuration to be compared with a vehicle configuration that ought to exist on the basis of the recognized geographical location area. In this case, it would be possible for the vehicle measurement system (metric or imperial), for example, which is communicated on the vehicle bus, to be used as a basis.

Finally, plausibilization can also involve the use of the already explained structure of the data sent using the communication protocol.

In another development, the indicated method comprises the step of conversion of the data transferred between the communication protocol and the network layer situated above the communication protocol. If the communication protocol has the application layer above it, for example, then it is possible for data from the application layer to be converted into the correct communication protocol prior to sending and for received data from the communication protocol to be converted to a consistent standard format for the application layer. This has the advantage that the application layer can be developed in a standardized manner for all types of communication protocols, so that programmers in the application layer do not need to think about the communication protocol used.

According to a further aspect, a control apparatus is set up to perform a method as claimed in one of the preceding claims.

In a development of the indicated control apparatus, the indicated apparatus has a memory and a processor. In this case, the indicated method is stored in the memory in the form of a computer program and the processor is provided for the purpose of performing the method when the computer program is loaded into the processor from the memory.

According to a further aspect, a computer program comprises program code means in order to perform all steps of one of the indicated methods when the computer program is executed on a computer or one of the indicated apparatuses.

According to a further aspect, a computer program product contains a program code that is stored on a computer readable data storage medium and that, when executed on a data processing device, performs one of the indicated methods.

According to another aspect, a vehicle comprises an indicated control apparatus.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method for providing data that is receivable by a vehicle in a vehicle ad-hoc network, in which the data is transmitted using a location dependent communication protocol between network subscribers subscribing to the vehicle ad-hoc network, comprising:
   recognizing a geographical location area for identifying the geographical location area of the vehicle via a vehicle-to-X transmitter;
   selecting a communication protocol suitable for transmitting and receiving of data based on the identified geographical location area;
   receiving data using the selected communication protocol, such that the received data is available to at least one layer situated above the communication protocol; and
   converting the data transferred between the communication protocol and the layer situated above the communication protocol.

2. The method as claimed in claim 1, wherein recognizing the geographical location area for identifying the geographical location area of the vehicle further comprises recognizing a previously known location area, and performing a check to determine whether known features are available for the previously known location area.

3. The method as claimed in claim 2, wherein the known feature is a geographical position that is associable with the previously known geographical location area and received via a global satellite navigation system.

4. The method as claimed in claim 1, wherein recognizing the geographical location area is performed on the basis of at least one of:
   a mobile radio system that is associable with the recognized geographical location area;
   a comparison between a previously stored geographical location area and the recognized geographical location area;
   a comparison between a current vehicle configuration and a vehicle configuration that is associated with the recognized geographical location area; and
   a structure, associable with the recognized geographical location area, of data that are receivable using the communication protocol.

5. A method for sending data via a vehicle ad-hoc network in which the data are transmitted using a location dependent communication protocol between network subscribers subscribing to the vehicle ad-hoc network, with a vehicle as a network subscriber comprising:
   recognizing a geographical location area for identifying the geographical location area of the vehicle via a vehicle-to-X transmitter;
   selecting a communication protocol suitable for transmitting and receiving of data based on the identified geographical location area;
   retrieving the data from at least one layer situated above the communication protocol;
   converting the data transferred between the communication protocol and the layer situated above the communication protocol; and
   sending of the retrieved data using the selected communication protocol.

6. The method as claimed in claim 5, wherein recognizing the geographical location area for identifying the geographical location area of the vehicle further comprises recognizing a previously known location area, and performing a check to determine whether known features are available for the previously known location area.

7. The method as claimed in claim 6, wherein the known feature is a geographical position that is associable with the previously known geographical location area and received via a global satellite navigation system.

8. The method as claimed in claim 5, wherein recognizing the geographical location area is performed on the basis of at least one of:
   a mobile radio system that is associable with the recognized geographical location area;
   a comparison between a previously stored geographical location area and the recognized geographical location area;
   a comparison between a current vehicle configuration and a vehicle configuration that is associated with the recognized geographical location area; and a structure, associable with the recognized geographical location area, of data that are receivable using the communication protocol.

\* \* \* \* \*